United States Patent
Chiang et al.

(10) Patent No.: US 8,625,697 B2
(45) Date of Patent: Jan. 7, 2014

(54) OFDM BEAMFORMER, AND A SIGNAL RECEIVING SYSTEM INCORPORATING THE SAME

(75) Inventors: Ching-Tai Chiang, Kaohsiung (TW); Rong-Ching Wu, Kaohsiung (TW); Chen-Sen Ouyang, Kaohsiung (TW); Jong-Ian Tsai, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 257 days.

(21) Appl. No.: 13/178,977

(22) Filed: Jul. 8, 2011

(65) Prior Publication Data

US 2013/0010898 A1  Jan. 10, 2013

(51) Int. Cl.
H04B 7/02 (2006.01)

(52) U.S. Cl.
USPC .......... 375/267; 375/260; 375/271; 375/295; 375/316; 375/342

(58) Field of Classification Search
USPC ......... 375/229, 259, 260, 261, 265, 267, 269, 375/270, 295, 297, 299, 302, 306, 316, 320, 375/340, 342, 347, 350
See application file for complete search history.

(56) References Cited

U.S. PATENT DOCUMENTS

| | | | |
|---|---|---|---|
| 7,519,125 B2 * | 4/2009 | Maltsey et al. | 375/260 |
| 7,764,750 B2 * | 7/2010 | Finkelstein et al. | 375/343 |
| 8,218,665 B2 * | 7/2012 | Chin et al. | 375/262 |
| 2004/0001554 A1 * | 1/2004 | Sun et al. | 375/260 |
| 2004/0008614 A1 * | 1/2004 | Matsuoka et al. | 370/203 |
| 2004/0264558 A1 * | 12/2004 | Chae et al. | 375/148 |
| 2005/0213556 A1 * | 9/2005 | Wax et al. | 370/349 |
| 2006/0140297 A1 * | 6/2006 | Maltsev et al. | 375/260 |
| 2008/0018533 A1 * | 1/2008 | Van Wechel et al. | 342/357.12 |
| 2010/0208834 A1 * | 8/2010 | Van Zelst et al. | 375/267 |
| 2011/0249773 A1 * | 10/2011 | Lee | 375/316 |
| 2012/0294350 A1 * | 11/2012 | Allpress et al. | 375/229 |

OTHER PUBLICATIONS

Liu et al.; "Efficient Adaptive Array Receiver for OFDM based Wireless Local Area Networks (WLAN)", IEEE Trans, Consumer electronics, vol. 50, No. 4, pp. 1101-1106; Nov. 2004.

* cited by examiner

*Primary Examiner* — Hirdepal Singh
(74) *Attorney, Agent, or Firm* — Alan Kamrath; Kamrath IP Lawfirm, P.A.

(57) ABSTRACT

An OFDM beamformer of a signal receiving system receives multiple frequency-domain sample signal vectors each transformed from arrival signals received by a corresponding antenna element of an antenna array, and includes: multiple signal splitters each splitting a corresponding frequency-domain sample signal vector into a data signal subvector and a pilot signal subvector based on predetermined position information; a weight generator generating an estimated auto-correlation matrix and an estimated cross-correlation vector based on the data signal subvectors, the pilot signal subvectors, and a reference pilot signal vector associated with a desired user, and generating an optimal weight vector based on the estimated auto-correlation matrix and the estimated cross-correlation vector; and a combining unit combining, based on the optimal weight vector, serial data signals converted from each data signal vector by a corresponding parallel-to-serial converter to generate an estimated data symbol output corresponding to the desired user.

2 Claims, 5 Drawing Sheets

FIG. 5

OFDM BEAMFORMER, AND A SIGNAL RECEIVING SYSTEM INCORPORATING THE SAME

BACKGROUND OF THE INVENTION

1. Field of the Invention

The invention relates to a beamforming technique, and more particularly to an OFDM beamformer, and a signal receiving system incorporating the same.

2. Description of the Related Art

The wireless communication system design has a current trend toward orthogonal frequency-division multiplexing (OFDM) for high-speed data transmission over frequency-selective fading channels. OFDM wireless communications with high data rates have been successfully applied to digital audio broadcasting (DAB), digital video broadcasting (DVB) and wireless local area networks (WLAN). When different users appear in the same spectrum, co-channel interference (CCI) may occur and signal communication quality may degrade. Thus, antenna array beamforming has been developed to reduce CCI.

In recent years, antenna array schemes have been proposed to mitigate CCI and improve bit error rate (BER) performance. For pre-fast Fourier transform (pre-FFT) beamforming, low computational complexity is required but performance degradation limits its applications. For post-FFT beamforming, time-domain signals received at a receiving end are transformed into frequency-domain signals prior to beamforming process. However, a beamforming weight vector for each subcarrier is obtained through a large number of computational operations.

A conventional post-FFT beamforming scheme has been proposed in an article by Y. Liu and Y. Yang, entitled "Efficient Adaptive Array Receiver for OFDM based Wireless Local Area Networks (WLAN)," IEEE Trans, Consumer Electronics, vol. 50, no. 4, pp. 1101-1106, November 2004. In the conventional post-FFT beamforming scheme, one set of weight vectors are computed from a specific subcarrier and are utilized to process all the subcarriers, and channel estimation and equalization are employed to compensate channel variations and achieve comparable performance.

A conventional blind beamforming scheme has been proposed in an article by Y. F. Chen and C. S. Wang, entitled "Adaptive Antenna Arrays for Interference Cancellation in OFDM Communication Systems with Virtual Carriers," IEEE Trans. Veh. Technol., vol. 56, no. 4, pp. 1837-1844, July 2007. In the conventional blind beamforming scheme, a single weight vector is applied to all subcarriers in an OFDM-based system. For an OFDM receiver, beamformer processing is arranged after parallel-to-serial converting. Thus, a weight vector of the beamformer can be computed without a training sequence. In addition, channel impulse response estimation can be omitted.

It is noted that bit error rate (BER) performance is not discussed in the conventional post-FFT beamforming scheme and the conventional blind beamforming scheme. Therefore, improvements may be made to the above techniques.

SUMMARY OF THE INVENTION

Therefore, an object of the present invention is to provide an OFDM beamformer, and a signal receiving system incorporating the same that can overcome the aforesaid drawbacks of the prior art.

According to one aspect of the present invention, signal receiving system comprises:

an antenna array including a number (L) of uniformly spaced apart antenna elements;

a number (L) of serial-to-parallel converters, each of which is coupled to a corresponding one of the antenna elements for converting serial arrival signals received by the corresponding one of the antenna elements into a parallel time-domain sample signal vector;

a number (L) of fast Fourier transformers, each of which is coupled to a corresponding one of the serial-to-parallel converters for transforming the parallel time-domain sample signal vector from the corresponding one of the serial-to-parallel converter into a frequency-domain sample signal vector; and an orthogonal frequency-division multiplexing (OFDM) beamformer including a number (L) of signal splitters, each of which is coupled to a corresponding one of the fast Fourier transformers for splitting, based on predetermined position information, the frequency-domain sample signal vector from the corresponding one of the fast Fourier transformers into a data signal subvector and a pilot signal subvector, a number (L) of parallel-to-serial converters, each of which is coupled to a corresponding one of the signal splitters for converting the data signal vector from the corresponding one of the signal splitters into serial data signals, a weight generator coupled to the signal splitters for receiving the data signal subvectors and the pilot signal subvectors therefrom, and configured to generate an estimated auto-correlation matrix and an estimated cross-correlation vector based on the data signal subvectors, the pilot signal subvectors, and a reference pilot signal vector associated with a desired user and to generate an optimal weight vector based on the estimated auto-correlation matrix and the estimated cross-correlation vector, and a combining unit coupled to the parallel-to-serial converters and the weight generator for combining the serial data signals from the parallel-to-serial converters based on the optimal weight vector from the weight generator to generate an estimated data symbol output corresponding to the desired user.

According to another aspect of the present invention, there is provided an orthogonal frequency-division multiplexing (OFDM) beamformer adapted for receiving a plurality of frequency-domain sample signal vectors, each of which is transformed from arrival signals received by a corresponding antenna element of an antenna array. The OFDM beamformer comprises:

a plurality of signal splitters, each of which is adapted for splitting a corresponding one of the frequency-domain sample signal vectors into a data signal subvector and a pilot signal subvector based on predetermined position information;

a plurality of parallel-to-serial converters, each of which is coupled to a corresponding one of the signal splitters for converting the data signal vector from the corresponding one of the signal splitters into serial data signals;

a weight generator coupled to the signal splitters for receiving the data signal subvectors and the pilot signal subvectors therefrom, and configured to generate an estimated auto-correlation matrix and an estimated cross-correlation vector based on the data signal subvectors, the pilot signal subvectors, and a reference pilot signal vector associated with a desired user and to generate an optimal weight vector based on the estimated auto-correlation matrix and the estimated cross-correlation vector; and a combining unit coupled to the parallel-to-serial converters and the weight generator for combining the serial data signals from the parallel-to-serial converters based on the optimal weight vector from the weight generator to generate an estimated data symbol output corresponding to the desired user.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
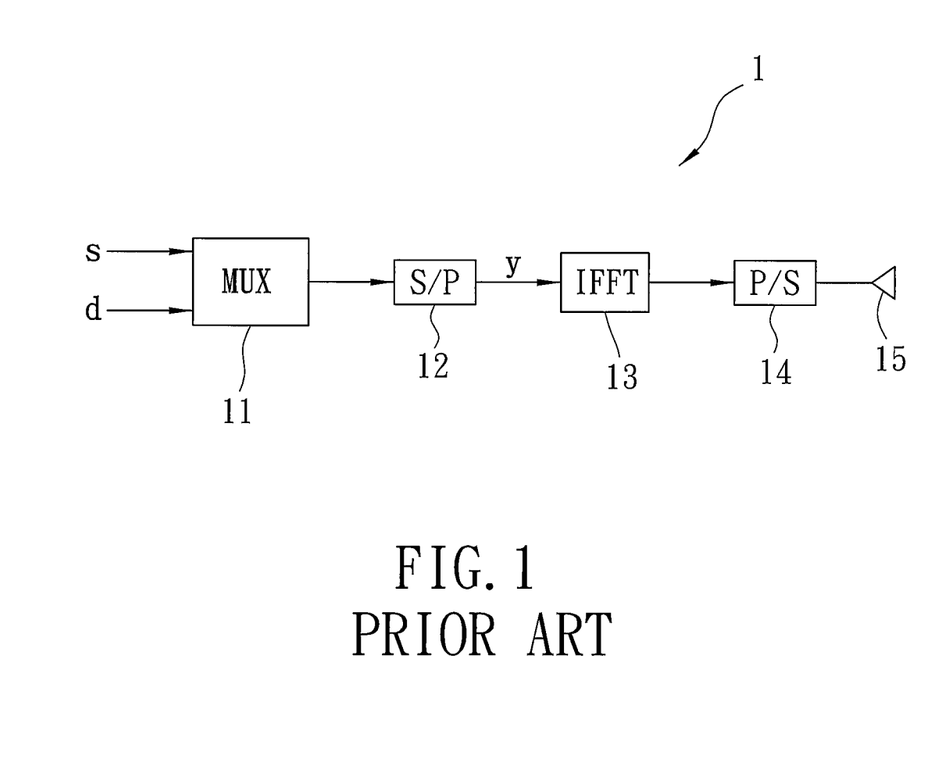
FIG. 1 is a schematic circuit block diagram illustrating an orthogonal frequency-division multiplexing (OFDM) transmitter.

FIG. 1 illustrates an orthogonal frequency-division multiplexing (OFDM) transmitter 1 in an OFDM communication system for transmitting N orthogonal subcarrier signals. The OFDM transmitter 1 includes a multiplexer 11, a serial-to-parallel converter 12, a normalized inverse fast Fourier transformer (IFFT) 13, a parallel-to-serial converter 14, and an antenna 15. The multiplexer 11 receives a data signal vector s, which consists of a number (N-D) of data signals, and a pilot signal vector d, which consist of a number (D) of pilot signals, to output a number (N) of serial multiplexing signals. In this embodiment, the pilot signals are comb-type pilot signals. The serial-to-parallel converter 12 converts the serial multiplexing signals into a parallel multiplexing signal vector y. The normalized IFFT 13 transforms the parallel multiplexing signal vector y in frequency domain into a parallel signal vector in time domain. The parallel-to-serial converter 14 converts the parallel signal vector into a number (N) of serial multiplexing signals that are transmitted by the antenna 15 to wireless channels with Rayleigh fading. The serial multiplexing signals transmitted by the antenna 15 are in the form of N orthogonal subcarriers.

For an $n^{th}$ block with M-ray square QAM (M-QAM) symbol from each user in the OFDM communication system, the data signal vector can be represented by the following expression: $s(n)=[s_1(n), s_2(n), \ldots, s_{N-D}(n)]^T$, the pilot signal vector can be represented by the following expression: $d(n)=[d_1(n), d_2(n), \ldots, d_D(n)]^T$, and the multiplexing signal vector can be represented by the following expression: $y(n)=[y_1(n), y_2(n), \ldots, y_N(n)]^T$, where the superscript T is a transpose operator. The D pilot signals are inserted into the (N-D) data signals in a specified insertion manner to constitute the multiplexing signal vector y.

For instance, when there are U users in the ODFM communication system, one user, for example a first user, is the desired user, and the other (U-1) users are regarded as interferers such that (U-1) signals from the (U-1) users have the same property as a signal from the desired user and are regarded as (U-1) co-channel interferences (CCIs).

Figure 2:
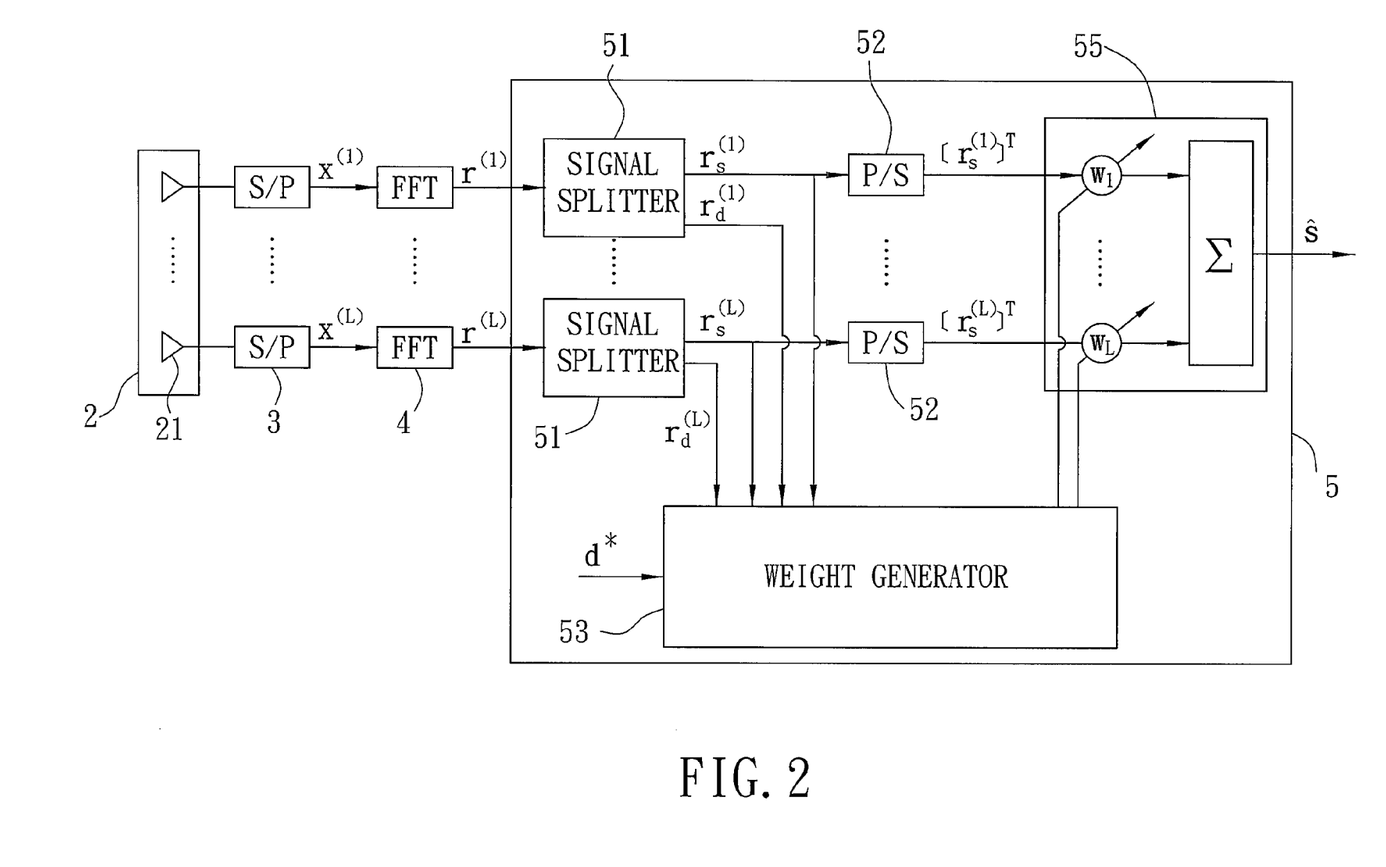
FIG. 2 is a schematic circuit block diagram illustrating the preferred embodiment of a signal receiving system according to the present invention.

Referring to FIG. 2, the preferred embodiment of a signal receiving system according to the present invention is shown to include an antenna array 2, a number (L) of serial-to-parallel converters 3, a number (L) of FFTs 4, and an OFDM beamformer 5.

The antenna array 2 includes a number (L) of uniformly spaced apart antenna elements 21.

Each serial-to-parallel converter 3 is coupled to a corresponding antenna element 21 for converting serial arrival signals received by the corresponding antenna element 21 into a parallel time-domain sample signal vector $x^{(l)}$, where $1 \leq l \leq L$. The N orthogonal subcarrier signals from each user in the OFDM communication system enter each antenna element 21 at an arrival angle ($\theta$) relative to the normal of the antenna array 2. For the arrival signals received by an $l^{th}$ antenna element 21, the sample signal vector $x^{(l)}$ for an $n^{th}$ block can be represented by the following Equation (1):

$$x^{(l)}(n) = \sum_{u=1}^{U} a_l(\theta_u)\alpha_u(n)F^H y_u(n) + v(n) \quad (1)$$

Where $a_l(\theta_u)=\exp(-j2\pi(l-1)d \sin \theta_u/\lambda)$ denotes the antenna response of the $l^{th}$ antenna element 21, in which d is a distance between centers of any adjacent two antenna elements 21, $\lambda$ is the wavelength of a carrier signal, and $\theta_u$ is the arrival angle. $\alpha_u(n)$ denotes a channel gain of the $u^{th}$ user, and is a zero-mean complex Gaussian random variable (Rayleigh fading) with variance $\sigma_u^2$. Assume that the channel gain $\alpha_u(n)$ remains constant over a block spanning at least one OFDM symbol time. $F^H$ denotes normalized IFFT operation matrix and can be obtained from the following Equation (2):

$$F = \frac{1}{\sqrt{N}} \begin{bmatrix} 1 & 1 & \cdots & 1 \\ 1 & W_N & \cdots & W_N^{N-1} \\ \vdots & \vdots & \ddots & \\ 1 & W_N^{N-1} & \cdots & W_N^{(N-1)(N-1)} \end{bmatrix} \quad (2)$$

where complex quantity $W_N$ is defined as $\exp(-j2\pi/N)$. The superscript H denotes Hermitian transpose. $v(n)$ represents the additive white complex Gaussian noise (AWGN) vector of the $n^{th}$ block at the $l^{th}$ antenna element 21. The variance of the Gaussian noise is $\sigma_v^2/\sqrt{2}+j\sigma_v^2/\sqrt{2}$.

Each FFT 4 is coupled to a corresponding serial-to-parallel converter 3 for transforming the parallel time-domain sample signal vector $x^{(l)}$ from the corresponding serial-to-parallel converter 3 into a frequency-domain sample signal vector $r^{(l)}$. Thus, the sample signal vector $r^{(l)}$ for the $n^{th}$ block can be represented by the following Equation (3):

$$r^{(l)}(n) = \sum_{u=1}^{U} a_l(\theta_u)\alpha_u(n)y_u(n) + z(n) \quad (3)$$

where $z(n)=Fv(n)$.

The OFDM beamformer 5 includes a number (L) of signal splitters 51, a number (L) of parallel-to-serial converters 52, a weight generator 53, and a combining unit 55.

Each signal splitter 51 is coupled to a corresponding FFT 4 for splitting, based on predetermined position information, the frequency-domain sample signal vector $r^{(l)}$ from the corresponding FFT 4 into a data signal subvector $r_s^{(l)}$ and a pilot signal subvector $r_d^{(l)}$. The predetermined position information includes specified positions corresponding respectively to the D pilot signals for a desired user. Thus, the data signal subvector $r_s^{(l)}$ for the $n^{th}$ block can be represented by the following Equation (4):

$$r_s^{(l)}(n) = \sum_{u=1}^{U} a_l(\theta_u)\alpha_u(n)s_u(n) + z_s(n) \quad (4)$$

where $s_u(n)=[y_{(1)}^N(n), y_{(2)}^N(n) \ldots, y_{N-D}^N(n)]^T$ and $z_s(n)=[z_{(1)}(n), z_{(2)}(n) \ldots, z_{N-D}(n)]^T$. The subscripts (1) (2), ..., (N-D) denote the indexes of the subcarriers for the data signals from the desired user. The pilot signal subvector $r_d^{(l)}$ for the $n^{th}$ block can be represented by the following Equation (5):

$$r_d^{(l)}(n) = \sum_{u=1}^{U} a_l(\theta_u)\alpha_u(n)d_u(n) + z_d(n) \quad (5)$$

where $d_u(n)=[y_{(1)'}^N(n), y_{(2)'}^N(n) \ldots, y_{(D)'}^N(n)]^T$ and $z_d(n)=[z_{(1)'}(n), z_{(2)'}(n) \ldots, z_{(D)'}(n)]^T$. The subscripts (1)', (2)', ..., (D)' denote the indexes of the subcarriers for the pilot signals from the desired user.

Equation (4) can also be represented in a compact matrix form as the following Equation (6):

$$R_s(n)=A(\theta)H(n)S(n)+Z_s(n) \quad (6)$$

where $A(\theta)=[(a(\theta_1), \ldots, a(\theta_U)] \in C^{L \times U}$ is an L×U complex matrix of direction vectors, in which $a(\theta_u)$ is an complex direction vector and $a(\theta_u)=[a_1(\theta_u), \ldots, a_2(\theta_u), \ldots, a_L(\theta_u)]^T$. H(n) is a U×U channel gain matrix, and H(n)= diag($[\alpha_1(n), \ldots, \alpha_U(n)]$). S(n) is a U×(N-D) corresponding data matrix, and S(n)=$[s_1(n), \ldots, s_U(n)]^T$. $Z_s(n)$ is an L×(N-D) AWGN matrix.

Similarly, Equation (5) can also be represented in a compact matrix form as the following Equation (7):

$$R_d(n)=A(\theta)H(n)D(n)+Z_d(n) \quad (7)$$

Where D(n) denotes a corresponding pilot matrix, D(n)= $[d_1(n), \ldots, d_U(n)]^T \in C^{U \times D}$, and AWGN matrix $Z_d(n) \in C^{L \times D}$.

Each parallel-to-serial converters 52 is coupled to a corresponding signal splitter 51 for converting the data signal subvector $r_s^{(l)}$ from the corresponding signal splitter into serial data signals $[r_s^{(l)}]^T$.

The weight generator 53 is coupled to the signal splitters 51 for receiving the data signal subvectors $r_s^{(l)}, \ldots, r_s^{(L)}$ and the pilot signal subvectors $r_d^{(l)}, \ldots, r_d^{(L)}$ therefrom. The weight generator 53 is configured to generate an estimated auto-correlation matrix $\hat{R}$ and an estimated cross-correlation vector $\hat{p}$ based on the data signal subvectors $r_s^{(l)}, \ldots, r_s^{(L)}$, the pilot signal subvectors $r_d^{(l)}, \ldots, r_d^{(L)}$, and a reference pilot signal vector d* associated with the desired user, and to generate an optimal weight vector $w_o$ based on the estimated auto-correlation matrix $\hat{R}$ and the estimated cross-correlation vector $\hat{p}$.

Theoretically, a correlation matrix R can be represented by the following Equation (8):

$$R = \frac{1}{N-D}E(R_sR_s^H) = \sum_{u=1}^{U} E_u\sigma_u^2 a(\theta_u)a^H(\theta_u) + N_0 I_L \quad (8)$$

where $E_u$ denotes the symbol energy of a $u^{th}$ user, and $I_L$ denotes an L×L identity matrix. Similarly, a cross-correlation vector p can be represented by the following Equation (9):

$$p = \frac{1}{D}E(R_dd^*) = E_1\sigma_1^2 a(\theta_1) \quad (9)$$

In practice, the correlation matrix R and the cross-correlation vector p are usually unknown. As such, the estimated auto-correlation matrix $\hat{R}$ can be calculated according to the following Equation (10):

$$\hat{R} = \frac{1}{B(N-D)}\sum_{n=1}^{B}[R_s(n)R_s^H(n)] \quad (10)$$

The estimated cross-correlation vector $\hat{p}$ can be calculated according to the following Equation (11):

$$\hat{p} = \frac{1}{BD}\sum_{n=1}^{B}[R_d(n)d^*(n)] \quad (11)$$

where B is the number of blocks. According to the Wiener solution, the optimal weight vector $w_o$ can be calculated according to the following Equation (12):

$$w_o = \hat{R}^{-1}\hat{p} \quad (12)$$

The optimal weight vector $w_o$ has maximum signal-to-interference-plus-noise ratio criterion.

The combining unit 55 is coupled to the parallel-to-serial converters 52 and the weight generator 53 for combining the serial data signals $[r_s^{(l)}]^T, \ldots, [r_s^{(L)}]^T$ from the parallel-to-serial converter 52 based on the optimal weight vector $w_o$ from the weight generator 53 to generate an estimated data symbol output $\hat{s}$ corresponding to the desired user. The estimated data symbol output $\hat{s}$ can be obtained according to the following Equation (13):

$$\hat{s} = w_o^H R_s = \tilde{s} + z' + c \quad (13)$$

where $\tilde{s}$ is attributed to the desired user, i.e., the first user, z' is attributed to noise, and c is attributed to the CCIs. Using Equations (6) and (13), $\tilde{s}$ can be represented by the following Equation (14):

$$\tilde{s} = \alpha_1 w_o^H a(\theta_1)s_1 \quad (14)$$

Using Equations (9), (12), and (14), the following Equation (15) can be obtained.

$$w_o^H a(\theta_1) = E_1\sigma_1^2 a^H(\theta_1)R^{-1}a(\theta_1) \geq 0 \quad (15)$$

Then, each data subsymbol in $\tilde{s}$ has a Rayleigh distribution with a average power $P_s$. The average power $P_s$ can be represented by the following Equation (16):

$$P_s = \sigma_1^2 E_1 \|w_o^H a(\theta_1)\|^2 \quad (16)$$

z' can be represented by the following Equation (17)

$$z' = w_o^H Z_s \quad (17)$$

As seen from Equations (1)-(4), (6) and (12), it can be easily obtained that the real part and the imaginary of each element in z' have zero mean Gaussian distribution with an average variance of $\|w_o\|^2 N_0/2$. c denotes a composite signal vector from the other (U-1) users, and can be represented by the following Equation (18):

$$c = \sum_{u=2}^{U} \alpha_u w_o^H a(\theta_u) s_u \tag{18}$$

Since the channel gain $\alpha_u$ is complex Gaussian, the real part and the imaginary part of each element in c also have zero mean Gaussian distribution with an average variance of $$\sum_{u=2}^{U} \|w_o a(\theta_u)\|^2 \sigma_u^2 E_u.$$

Thus, according to Equations (13)-(18), the estimated data symbol output ŝ can also be represented by the following Equation (19):

$$\hat{s} = \tilde{s} + n_E \tag{19}$$

where $n_E$ is a total equivalent additive Gaussian noise vector. The real part and the imaginary part of each element in $n_E$ is normally distributed with a zero mean and an average variance $\sigma_E^2$ as shown in Equation (20).

$$\sigma_E^2 = \|w_o\|^2 N_0/2 + \sum_{u=2}^{U} \|w_o a(\theta_u)\|^2 \sigma_u^2 E_u \tag{20}$$

From Equations (16) and (20), the effective instantaneous output SINR per bit γ can be represented by the following Equation (21):

$$\gamma = \frac{\alpha_1^2 E_{b1} \|w_o^H a(\theta_1)\|^2}{\|w_o\|^2 N_0/2 + \sum_{u=2}^{U} \|w_o a(\theta_u)\|^2 \alpha_u^2 E_{bu}} \tag{21}$$

where $E_{bu}$ denotes the bit energy for each user and can be represented by the following equation: $E_{bu} = E_u/\log_2 M$. Then, the average output SINR per bit $\bar{\gamma}$ can be represented by the following Equation (22):

$$\bar{\gamma} = \frac{\sigma_1^2 E_{b1} \|w_o^H a(\theta_1)\|^2}{\|w_o\|^2 N_0/2 + \sum_{u=2}^{U} \|w_o a\|^2 \sigma_u^2 E_{bu}} \tag{22}$$

Referring to an article by K. Cho and D. Yoon, entitled "On the General BER Expression of One- and two-dimensional Amplitude Modulations," IEEE Trans, Comun., vol. 50, no. 2, pp. 1174-1080, July 2002, for M-QAM, the $k^{th}$ bit error probability $P'_b(k)$ of each data symbol over the AWGN channel can be obtained by the following Equation (23):

$$P'_b(k) = \frac{1}{\sqrt{M}} \sum_{i=0}^{(1-2^{-k})\sqrt{M}-1} X_M(k,i) \operatorname{erfc}\left(\sqrt{\frac{Y_M(k,i) E_b}{N_0}}\right) \tag{23}$$

where $X_M(k,i)$ and $Y_M(k,i)$ can be represented respectively by the following Equations (24) and (25):

$$X_M(k,i) = (-1)^{\left\lfloor \frac{i \cdot 2^{k-1}}{\sqrt{M}} \right\rfloor} \left( 2^{k-1} - \left\lfloor \frac{i \cdot 2^{k-1}}{\sqrt{M}} + \frac{1}{2} \right\rfloor \right) \tag{24}$$

$$Y_M(k,i) = (2i+1)^2 \frac{3 \log_2 M}{2(M-1)}, \tag{25}$$

and $\lfloor \cdot \rfloor$ denotes the floor function. To obtain the $k^{th}$ bit error probability of M-QAM in the OFDM beamformer 5 over Rayleigh fading channels, first, the conditional BER can be obtained by replacing $E_b/N_0$ in Equation (23) with $\gamma' = \gamma/2$, and then the $k^{th}$ BER can be evaluated by the following Equation (26):

$$P_b(k) = \frac{1}{\sqrt{M}} \sum_{i=0}^{(1-2^{-k})\sqrt{M}-1} X_M(k,i) \int_0^\infty \operatorname{erfc}(\sqrt{Y_M(k,i)\gamma'}) f_{\gamma'}(\gamma') d\gamma' \tag{26}$$

where the probability density function (PDF) $f_{\gamma'}(\gamma')$ of instantaneous SINR over a Rayleigh fading channel can be represented by the following Equation (27):

$$f_{\gamma'}(\gamma') = \frac{1}{\bar{\gamma}'} \exp\left(\frac{-\gamma'}{\bar{\gamma}'}\right) \tag{27}$$

and $\bar{\gamma}' = \bar{\gamma}/2$. By substituting Equations (22), (24), (25) and (27) into Equation (26), we can obtain the following Equation (28):

$$P_b(k) = \frac{1}{\sqrt{M}} \sum_{i=0}^{(1-2^{-k})\sqrt{M}-1} \frac{X_M(k,i)}{\bar{\gamma}'} \int_0^\infty \exp\left(-\frac{\gamma'}{\bar{\gamma}'}\right) \times \operatorname{erfc}(\sqrt{Y_M(k,i)\gamma'}) d\gamma'$$

$$= \frac{1}{\sqrt{M}} \sum_{i=0}^{(1-2^{-k})\sqrt{M}-1} X_M(k,i) \left(1 - \sqrt{\frac{Y_M(k,i)\bar{\gamma}'}{Y_M(k,i)\bar{\gamma}' + 1}}\right)$$

$$= \frac{1}{\sqrt{M}} \sum_{i=0}^{(1-2^{-k})\sqrt{M}-1} X_M(k,i) \left(1 - \sqrt{\frac{Y_M(k,i)\bar{\gamma}}{Y_M(k,i)\bar{\gamma} + 2}}\right) \tag{28}$$

Finally, using Equation (28), the exact expression of an average BER for M-QAM in the OFDM beamformer 5 over a Rayleigh fading channel can be obtained by the following Equation (29):

$$P_b = \frac{1}{\log_2 \sqrt{M}} \sum_{k=1}^{\log_2 \sqrt{M}} P_b(k) \tag{29}$$

Simulation Verification

Figure 3:
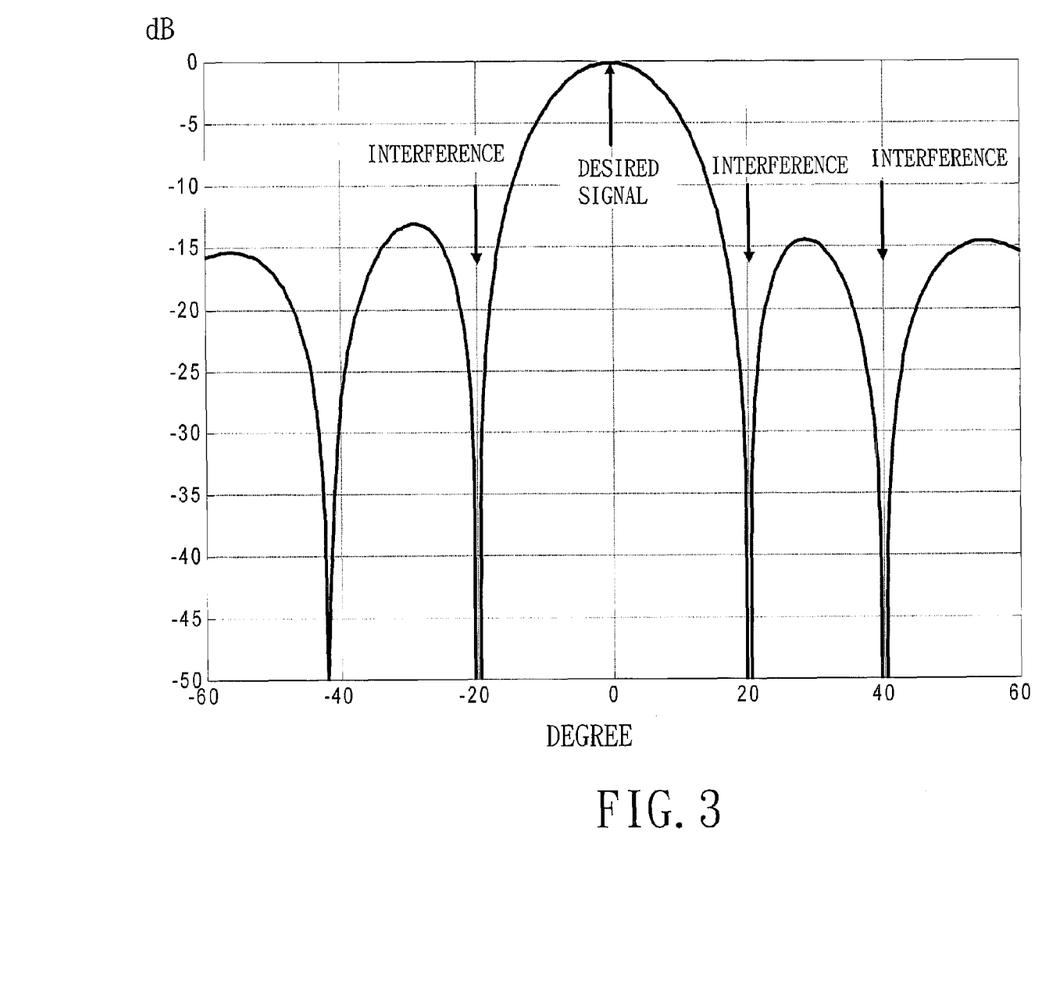
FIG. 3 is a plot of a beam pattern of an OFDM beamformer of the preferred embodiment when an antenna array includes six antenna elements.

FIG. 3 illustrates a beam pattern of the OFDM beamformer 5 when the antenna array 2 is a linear antenna array and includes six antenna elements 21. The distance between two adjacent antenna elements 21 of the antenna array 2 is equal to half the wavelength of the carrier signal. The variance $\sigma_u^2$ of each Rayleigh fading channel is 0.5. A desired signal with $E_{b1}/N_0$ equal to 10 dB enters the antenna array 2 at 0° relative to the normal of the antenna array 2. Three co-channel interferences with $E_{bi}/N_0$ equal to 20 dB enter the antenna array 2 at −20°, 20° and 40°, respectively. Using the optimal weight vector shown in Equation (12), it can be seen that the nulls are precisely located at the arrival angles of the co-channel interferences while the largest gain is directed toward the arrival angle of the desired signal.

Figure 4:
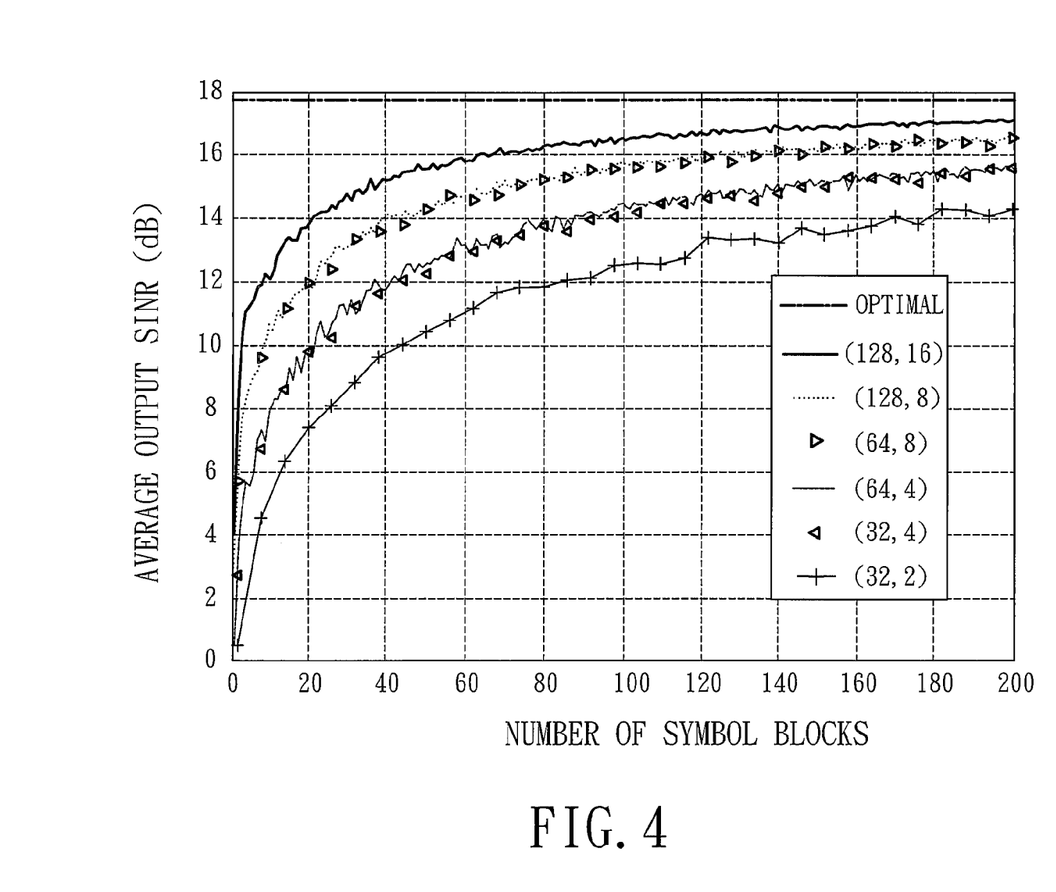
FIG. 4 is a simulation plot, illustrating the relationship between an average output signal-to-interference-plus-noise ratio (SINR) of the preferred embodiment (100 trials) and the number of blocks for 16-QAM.

FIG. 4 shows a simulation result that illustrates the relationship between an average output signal-to-interference-plus-noise ratio (SINR) of the preferred embodiment (100 trials) and the number of blocks for 16-QAM. The pilot signals for the desired user are Comb-type pilot signals. The average output SINR $\bar{\gamma}$ shown in Equation (22) can be calculated by an estimated optimal weight vector $\hat{w}_o$ represented by the following equation: $\hat{w}_o = \hat{R}^{-1}\hat{p}$, where $\hat{R}$ and $\hat{p}$ can be obtained using Equations (10) and (11), respectively. The simulation result is carried out based on 200 symbol blocks and averages of 100 independent trails. The optimum average output SINR is 17.7 dB. For the same number of symbol blocks, according to Equations (10) and (11), the larger the number of subcarriers and the number of pilot signals, the faster will be convergence of the estimation of R and p. Thus, (128, 16), i.e. 128 subcarriers and 16 pilot signals, has the fastest convergence performance, in which the average output SINR is about 17 dB at the 200$^{th}$ symbol block. The simulation result demonstrates that there is a trade-off in the complexity of estimating the optimal weight vector $w_o$, i.e. estimating R as well as p, and the convergence performance of the signal receiving system of the preferred embodiment. Note that curves corresponding to (128, 8) and (64, 8) overlap closely each other. This is because that, in this case, estimating p with D=8 in Equation (11) is a dominant factor for the estimation of $w_o$. Similarly, a curve corresponding to (64, 4) is close to a curve corresponding to (32, 4).

Figure 5:
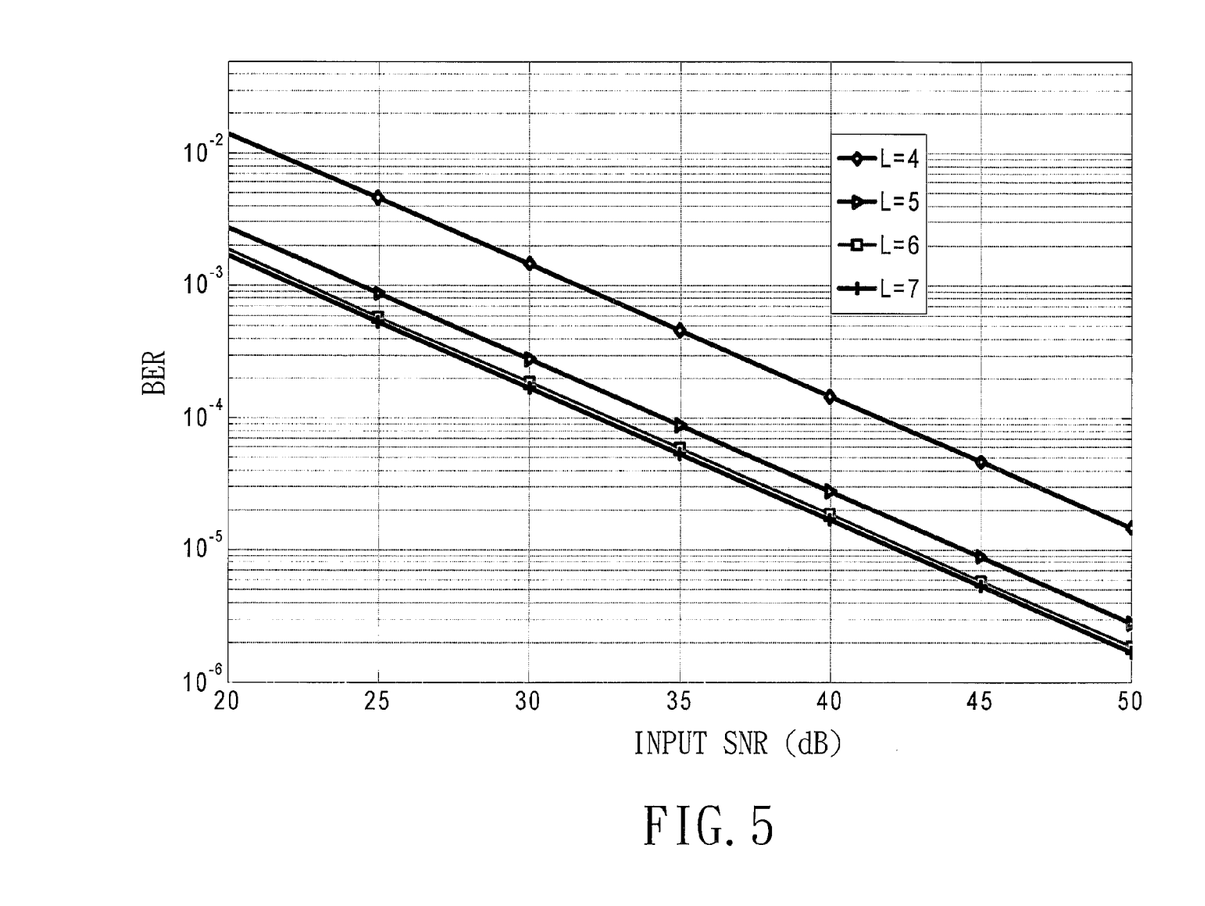
FIG. 5 is a simulation plot, illustrating the relationship between a bit error rate (BER) of the preferred embodiment and an input signal-to-noise ratio (SNR) of a desired signal for antenna arrays with different numbers of antenna elements.

FIG. 5 shows a simulation result that illustrates the relationship between the BER for 64-QAM of the preferred embodiment and an input signal-to-noise ratio (SNR) of a desired signal for the antenna array 2 with a different number (L) of the antenna elements 21. As seen from FIG. 5, the larger the number (L) of the antenna elements 21, the smaller will be the BER. That is, the BER performance is dramatically improved when L changes from 4 to 5. A BER gap between a curve corresponding to L=5 and a curve corresponding to L=6 is obviously narrower than that between a curve corresponding to L=4 and the curve corresponding to L=5. Moreover, two curves corresponding to L=6 and L=7 almost overlap each other. This BER performance can be explained by the following: when L=4, the antenna array 2 cannot effectively eliminate three CCIs. When L increases, however, the BER performance can be greatly improved. Thus, when L=6, the three CCIs can be effectively eliminated.

In sum, the OFDM beamformer 5 has a relatively simple construction and processes beamforming in lower computational complexity. The signal receiving system of the present invention can obtain a closed-form expression of the BER performance. In addition, the optimal weight vector generated by the weight generator 53 is suitable for any desired signal with different numbers of subcarriers and pilot signals. The convergence rate of SINR is affected by numbers of subcarriers and pilot signals of a desired signal.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A signal receiving system comprising:
   an antenna array including a number (L) of uniformly spaced apart antenna elements;
   a number (L) of serial-to-parallel converters, each of which is coupled to a corresponding one of said antenna elements for converting serial arrival signals received by the corresponding one of said antenna elements into a parallel time-domain sample signal vector;
   a number (L) of fast Fourier transformers, each of which is coupled to a corresponding one of said serial-to-parallel converters for transforming the parallel time-domain sample signal vector from the corresponding one of said serial-to-parallel converter into a frequency-domain sample signal vector; and
   an orthogonal frequency-division multiplexing (OFDM) beamformer including:
   a number (L) of signal splitters, each of which is coupled to a corresponding one of said fast Fourier transformers for splitting, based on predetermined position information, the frequency-domain sample signal vector from the corresponding one of said fast Fourier transformers into a data signal subvector and a pilot signal subvector;
   a number (L) of parallel-to-serial converters, each of which is coupled to a corresponding one of said signal splitters for converting the data signal vector from the corresponding one of said signal splitters into serial data signals;
   a weight generator coupled to said signal splitters for receiving the data signal subvectors and the pilot signal subvectors therefrom, and configured to generate an estimated auto-correlation matrix and an estimated cross-correlation vector based on the data signal subvectors, the pilot signal subvectors, and a reference pilot signal vector associated with a desired user and to generate an optimal weight vector based on the estimated auto-correlation matrix and the estimated cross-correlation vector; and
   a combining unit coupled to said parallel-to-serial converters and said weight generator for combining the serial data signals from said parallel-to-serial converters based on the optimal weight vector from said weight generator to generate an estimated data symbol output corresponding to the desired user.

2. An orthogonal frequency-division multiplexing (OFDM) beamformer adapted for receiving a plurality of frequency-domain sample signal vectors, each of which is transformed from arrival signals received by a corresponding antenna element of an antenna array, said OFDM beamformer comprising:
   a plurality of signal splitters, each of which is adapted for splitting a corresponding one of the frequency-domain sample signal vectors into a data signal subvector and a pilot signal subvector based on predetermined position information;
   a plurality of parallel-to-serial converters, each of which is coupled to a corresponding one of said signal splitters for converting the data signal vector from the corresponding one of said signal splitters into serial data signals;

a weight generator coupled to said signal splitters for receiving the data signal subvectors and the pilot signal subvectors therefrom, and configured to generate an estimated auto-correlation matrix and an estimated cross-correlation vector based on the data signal subvectors, the pilot signal subvectors, and a reference pilot signal vector associated with a desired user and to generate an optimal weight vector based on the estimated auto-correlation matrix and the estimated cross-correlation vector; and a combining unit coupled to said parallel-to-serial converters and said weight generator for combining the serial data signals from said parallel-to-serial converters based on the optimal weight vector from said weight generator to generate an estimated data symbol output corresponding to the desired user.

* * * * *